(12) United States Patent
Jung (10) Patent No.: US 10,462,508 B2
(45) Date of Patent: Oct. 29, 2019

(54) METHOD OF RECOMMENDING PERSONAL BROADCASTING CONTENTS

(71) Applicant: WooJu Jung, Gwangju (KR)

(72) Inventor: WooJu Jung, Gwangju (KR)

(*) Notice: Subject to any disclaimer, the term of this patent is extended or adjusted under 35 U.S.C. 154(b) by 0 days.

(21) Appl. No.: 15/823,734

(22) Filed: Nov. 28, 2017

(65) Prior Publication Data

US 2019/0098352 A1    Mar. 28, 2019

(30) Foreign Application Priority Data

Sep. 22, 2017 (KR) .................. 10-2017-0122214

(51) Int. Cl.

| | | |
|---|---|---|
| *H04N 5/445* | (2011.01) | |
| *H04N 21/258* | (2011.01) | |
| *H04N 21/25* | (2011.01) | |
| *H04W 4/06* | (2009.01) | |
| *H04N 21/2668* | (2011.01) | |
| *H04N 21/80* | (2011.01) | |

(52) U.S. Cl.
CPC ..... *H04N 21/25891* (2013.01); *H04N 21/251* (2013.01); *H04N 21/2668* (2013.01); *H04W 4/06* (2013.01); *H04N 21/80* (2013.01)

(58) Field of Classification Search
CPC ......... H04N 21/25891; H04N 21/2668; H04N 21/251; H04N 21/80
USPC .......................................................... 725/46
See application file for complete search history.

(56) References Cited

U.S. PATENT DOCUMENTS

| | | | | |
|---|---|---|---|---|
| 5,842,200 A | * | 11/1998 | Agrawal | G06Q 30/02 |
| 5,905,973 A | * | 5/1999 | Yonezawa | G06F 3/04812 |
| | | | | 705/26.8 |
| 5,909,023 A | * | 6/1999 | Ono | G06Q 10/087 |
| | | | | 235/380 |
| 6,016,475 A | * | 1/2000 | Miller | G06F 17/30867 |
| | | | | 705/26.7 |
| 6,029,182 A | * | 2/2000 | Nehab | G06F 17/30867 |
| | | | | 707/E17.109 |
| 6,029,195 A | * | 2/2000 | Herz | G06F 17/30867 |
| | | | | 348/E7.056 |
| 6,041,311 A | * | 3/2000 | Chislenko | G06F 17/30699 |
| | | | | 705/26.7 |
| 6,049,777 A | * | 4/2000 | Sheena | G06F 17/30699 |
| | | | | 705/26.2 |
| 6,055,513 A | * | 4/2000 | Katz | G06Q 10/02 |
| | | | | 705/14.24 |
| 6,064,980 A | * | 5/2000 | Jacobi | G06Q 30/06 |
| | | | | 705/1.1 |

(Continued)

FOREIGN PATENT DOCUMENTS

| | | |
|---|---|---|
| KR | 10-2013-0117025 A | 10/2013 |
| KR | 10-2015-0059209 A | 6/2015 |

*Primary Examiner* — Michael B. Pierorazio
(74) *Attorney, Agent, or Firm* — Studebaker & Brackett PC (57) ABSTRACT

The present invention is related to a method for recommending personal broadcasting contents, comprising analyzing personal broadcasting contents conducted by a personal broadcasting host and analyzing broadcasting characteristics of the personal broadcasting host, determining current user characteristics including at least user status and user preference; and searching for broadcasting characteristics of a personal broadcasting host that matches the current user characteristics and providing at least one recommended personal broadcasting channel.

8 Claims, 5 Drawing Sheets

(56) References Cited

U.S. PATENT DOCUMENTS

| | | | | |
|---|---|---|---|---|
| 6,078,740 A * | 6/2000 | DeTreville | G06Q 30/02 | 703/22 |
| 6,092,049 A * | 7/2000 | Chislenko | G06F 17/30699 | 705/7.29 |
| 6,092,053 A * | 7/2000 | Boesch | G06Q 10/103 | 705/26.8 |
| 6,108,493 A * | 8/2000 | Miller | G06Q 40/08 | 707/999.002 |
| 6,112,186 A * | 8/2000 | Bergh | G06F 17/30699 | 705/14.37 |
| 6,144,964 A * | 11/2000 | Breese | G06F 17/30867 | 707/758 |
| 6,202,058 B1 * | 3/2001 | Rose | G06F 17/30699 | 706/45 |
| 6,266,649 B1 * | 7/2001 | Linden | G06Q 10/08345 | 705/14.51 |
| 6,317,722 B1 * | 11/2001 | Jacobi | G06Q 30/02 | 705/14.51 |
| 6,321,221 B1 * | 11/2001 | Bieganski | G06F 17/30699 | 705/26.7 |
| 6,330,592 B1 * | 12/2001 | Makuch | H04L 29/06 | 707/999.01 |
| 6,334,127 B1 * | 12/2001 | Bieganski | G06F 17/30867 | |
| 6,356,879 B2 * | 3/2002 | Aggarwal | G06Q 30/02 | 705/26.62 |
| 6,507,872 B1 * | 1/2003 | Geshwind | H04L 29/06 | 348/E7.047 |
| 6,587,127 B1 * | 7/2003 | Leeke | G06Q 20/123 | 715/733 |
| 6,691,163 B1 * | 2/2004 | Tufts | H04L 29/06 | 709/217 |
| 6,718,551 B1 * | 4/2004 | Swix | G06Q 30/02 | 348/E7.075 |
| 6,782,370 B1 * | 8/2004 | Stack | G06Q 30/02 | 705/26.1 |
| 6,873,967 B1 * | 3/2005 | Kalagnanam | G06Q 30/02 | 705/26.44 |
| 8,098,390 B1 * | 1/2012 | Yacoub | G06Q 30/0241 | 358/1.1 |
| 8,326,690 B2 * | 12/2012 | Dicker | G06Q 30/02 | 705/14.54 |
| 8,478,664 B1 * | 7/2013 | Xavier | G06Q 30/00 | 705/26.1 |
| 2001/0011235 A1 * | 8/2001 | Kim | G06Q 10/06375 | 705/7.31 |
| 2001/0013009 A1 * | 8/2001 | Greening | G06Q 10/063112 | 705/7.14 |
| 2002/0042920 A1 * | 4/2002 | Thomas | G06F 3/0481 | 725/87 |
| 2002/0046099 A1 * | 4/2002 | Frengut | G06Q 30/02 | 705/14.52 |
| 2002/0049637 A1 * | 4/2002 | Harman | G06Q 30/02 | 705/26.1 |
| 2002/0052788 A1 * | 5/2002 | Perkes | G06Q 20/10 | 705/14.23 |
| 2002/0062249 A1 * | 5/2002 | Iannacci | G06Q 20/10 | 705/14.1 |
| 2002/0144263 A1 * | 10/2002 | Eldering | G06Q 30/02 | 725/34 |
| 2003/0105682 A1 * | 6/2003 | Dicker | G06Q 30/02 | 705/26.8 |
| 2005/0144641 A1 * | 6/2005 | Lewis | G06Q 30/0225 | 725/60 |
| 2007/0156539 A1 * | 7/2007 | Yates | G06Q 30/02 | 705/26.61 |
| 2008/0235101 A1 * | 9/2008 | Piepenbrink | G06Q 20/20 | 705/16 |
| 2008/0235278 A1 * | 9/2008 | Piepenbrink | G06Q 30/02 | 705/14.69 |
| 2009/0187944 A1 * | 7/2009 | White | H04N 7/173 | 725/46 |
| 2009/0254945 A1 * | 10/2009 | Kinoshita | H04N 7/17318 | 725/60 |
| 2010/0125884 A1 * | 5/2010 | Howcroft | H04N 7/17318 | 725/93 |
| 2010/0332313 A1 * | 12/2010 | Miller | G06F 17/30867 | 705/14.44 |
| 2010/0333162 A1 * | 12/2010 | Lloyd | G06F 17/30424 | 725/131 |
| 2011/0061069 A1 * | 3/2011 | Arte | H04N 7/17318 | 725/14 |
| 2011/0145848 A1 * | 6/2011 | Moskowitz | H04H 60/33 | 725/13 |
| 2011/0153663 A1 * | 6/2011 | Koren | G06F 17/30964 | 707/776 |
| 2012/0060191 A1 * | 3/2012 | Angiolillo | H04N 5/44543 | 725/46 |
| 2012/0131475 A1 * | 5/2012 | Bhogal | G06Q 10/10 | 715/753 |
| 2012/0174159 A1 * | 7/2012 | Arte | H04N 21/2668 | 725/46 |
| 2012/0204201 A1 * | 8/2012 | Cassidy | H04N 21/258 | 725/10 |
| 2012/0239504 A1 * | 9/2012 | Curlander | G06Q 30/02 | 705/14.66 |
| 2012/0265644 A1 * | 10/2012 | Roa | G06Q 30/0643 | 705/26.61 |
| 2012/0296745 A1 * | 11/2012 | Harper | G06Q 30/02 | 705/14.64 |
| 2012/0303490 A1 * | 11/2012 | Hill | G06Q 30/00 | 705/27.2 |
| 2012/0303491 A1 * | 11/2012 | Hill | G06Q 30/06 | 705/27.2 |
| 2012/0310771 A1 * | 12/2012 | Selinger | G06Q 30/02 | 705/26.7 |
| 2012/0330786 A1 * | 12/2012 | Paleja | G06Q 30/02 | 705/26.41 |
| 2012/0331494 A1 * | 12/2012 | Pontual | H04N 21/44222 | 725/9 |
| 2014/0380346 A1 * | 12/2014 | Jagtiani | H04N 21/25891 | 725/13 |
| 2015/0296273 A1 * | 10/2015 | Kim | H04N 21/8173 | 725/32 |
| 2015/0304707 A1 * | 10/2015 | Vadura | H04N 21/43615 | 725/25 |

* cited by examiner

METHOD OF RECOMMENDING PERSONAL BROADCASTING CONTENTS

BACKGROUND OF THE INVENTION

Field of the Invention

The present invention is related to a method of recommending personal broadcasting contents and more specifically, a method of recommending personal broadcasting contents that recommends personal broadcasting contents suitable for personal broadcasting users.

Discussion of the Related Art

The personal broadcasting technology provides an environment where individuals may freely broadcast through various mobile devices. Personal broadcasting users may freely enjoy their favorite broadcasting programs according to their preferences. As a multitude of personal broadcasting channels are opened based on personal broadcasting platforms, users thereof spend considerable time to search for a broadcasting program best suited to their preferences.

The Korean Patent Laid-Open Publication No. 10-2013-0117025 (Oct. 25, 2013) is related to a method and an apparatus for recommending a radio program channel by using a portable device in a vehicle head unit control system and more particularly, provides an advantage for a driver to select a radio program in a safe and easy manner, including a process of receiving keyword information related to the user's preference, a process of determining at least one or more program channels corresponding to the keyword information by searching program guide information on the basis of the keyword information, and a process of displaying at least one or more shortcut icons mapped to at least one or more program channels.

The Korean Patent Laid-Open Publication No. 10-2015-0059209 (Jun. 1, 2015) relates to an apparatus and a method for recommending a broadcasting program through analysis of a sound source file and more particularly, includes a data management unit classifying an MP3 file of the user into an item including any one of an artist, genre, and title and storing the frequency of playing the classified MP3 file for each item in the form of a database; a data decision unit comparing data the frequency of play of which is ranked high among the stored data with a program being broadcast and in the occurrence of a broadcasting program including data ranked high, informing the user of existence of a recommended broadcasting program; and a broadcasting display unit obtaining an output signal of a broadcasting program recommended by the data decision unit from the user and displaying the broadcasting program automatically.

PRIOR ART DOCUMENT

Patent Document

1. Korean Patent Laid-Open Publication No. 10-2013-0117025 (Oct. 25, 2013)
2. Korean Patent Laid-Open Publication No. 10-2015-0059209 (Jun. 1, 2015)

SUMMARY OF THE INVENTION

One embodiment of the present invention provides a method for recommending personal broadcasting contents that recommends personal broadcasting contents to personal broadcasting users.

One embodiment of the present invention provides a method for recommending personal broadcasting contents that analyzes broadcasting characteristics of a personal broadcasting host by analyzing personal broadcasting contents conducted by the personal broadcasting host.

One embodiment of the present invention provides a method for recommending personal broadcasting contents that provides a recommended personal broadcasting channel by matching broadcasting characteristics of a personal broadcasting host to characteristics of a user.

Among embodiments, a method for recommending personal broadcasting contents includes (a) analyzing personal broadcasting contents conducted by a personal broadcasting host and analyzing broadcasting characteristics of the personal broadcasting host, (b) determining user characteristics including at least user status and user preference, and (c) searching broadcasting characteristics of a personal broadcasting host that matches the current user characteristics and providing at least one recommended personal broadcasting channel.

The (b) step may further include (b-1) analyzing the user status on the basis of a movement displacement of a user terminal and (b-2) analyzing the user preference on the basis of user preference contents.

The (a) step may include separating a first contents element generated by the personal broadcasting host and a second contents element not generated by the personal broadcasting host from the personal broadcasting contents.

The (a) step may further include determining broadcasting characteristics of the personal broadcasting host by applying different contents analysis techniques to the first and the second contents elements.

The (a) step may further include determining a core keyword through keyword analysis related to the first contents element and determining a specific associated word by analyzing correlation between each of a plurality of associated words dependent on the core keyword and the second contents element.

The (b-1) step may include calculating the movement displacement by analyzing positions of the user terminal collected at specific time points and analyzing the user status by analyzing correlation between a movement pattern analyzed on the basis of the movement displacement and a regular life pattern.

The (b-2) step may include determining the user preference by determining one of the first and the second contents element contained in the user preference contents.

The (b) step may include determining a life pattern inferred at the current time and a life pattern dependent user preference about personal broadcasting contents most preferred out of the life pattern as the current user characteristics.

The (c) step may include determining the at least one recommended personal broadcasting channel on the basis of the life pattern dependent user preference contained in the current user characteristics.

DETAILED DESCRIPTION OF THE EMBODIMENTS

Since description of the present invention is merely an embodiment for illustrating structural or functional description, it should not be interpreted that the technical scope of the present invention is limited by the embodiments described in this document. In other words, embodiments may be modified in various ways and implemented in various other forms; therefore, it should be understood that various equivalents realizing technical principles of the present invention belong to the technical scope of the present invention includes. Also, since it is not meant that a specific embodiment should support all of the purposes or effects intended by the present invention or include only the purposes or effects, the technical scope of the disclosed invention should be not regarded as being limited to the descriptions of the embodiment.

Meanwhile, implication of the terms used in this document should be understood as follows.

The terms such as "first" and "second" are introduced to distinguish one element from the others, and thus the technical scope of the present invention should not be limited by those terms. For example, a first element may be called a second element, and similarly, the second element may be called the first element.

If a constituting element is said to be "connected" to other constituting element, the former may be connected to the other element directly, but it should be understood that another constituting element may be present between the two elements. On the other hand, if a constituting element is said to be "directly connected" to other constituting element, it should be understood that there is no other constituting element present between the two elements. Meanwhile, other expressions describing a relationship between constituting elements, namely "between" and "right between" or "adjacent to" and "directly adjacent to" should be interpreted to provide the same implication.

A singular expression should be understood to indicate a plural expression unless otherwise explicitly stated. The term of "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

Identification symbols (for example, a, b, and c) for individual steps are used for the convenience of description. The identification symbols are not intended to describe the operation order of the steps. Therefore, unless otherwise explicitly indicated in the context of description, the steps may be executed differently from the stated order. In other words, the respective steps may be performed in the same order as stated in the description, actually performed simultaneously, or performed in a reverse order.

The present invention may be implemented in the form of program codes in a computer-readable recording medium, where a computer-readable recording medium includes all kinds of recording apparatus which store data that may be read by a computer system. Examples of a computer-readable recording medium include ROM, RAN, CD-ROM, magnetic tape, floppy disk, and optical data storage device.

Unless defined otherwise, all of the terms used in this document provide the same meaning as understood generally by those skilled in the art to which the present invention belongs. Those terms defined in ordinary dictionaries should be interpreted to have the same meaning as conveyed by a related technology in the context. And unless otherwise defined explicitly in the present invention, those terms should not be interpreted to have ideal or excessively formal meaning.

Personal broadcasting is real-time live broadcasting where an individual who wants to host personal broadcasting by using a broadcasting device such as a PC or a mobile device (in what follows, the individual is called a personal broadcasting host) opens a broadcasting channel and provides contents to an unspecified audience. Personal broadcasting is advantageous since any one may create and provide his or her own contents without involving a specialized technique, equipment, and cost.

Along with advancement of IP services and transmission control technology as well as the Internet, personal broadcasting is spreading rapidly among systems capable of transmitting a large amount of contents in real time and is taking the role as a primary contents creation channel in the personal media era.

Personal broadcasting may be divided into voice broadcasting and video broadcasting. Voice broadcasting does not provide an image screen and may correspond to the broadcasting conducted by voice, chatting, and hosting of an individual broadcaster. Music broadcasting occupies the most part of voice broadcasting. Video broadcasting may correspond to the broadcasting conducted by video contents, chatting, and hosting or commentary of an individual broadcaster.

Figure 1:
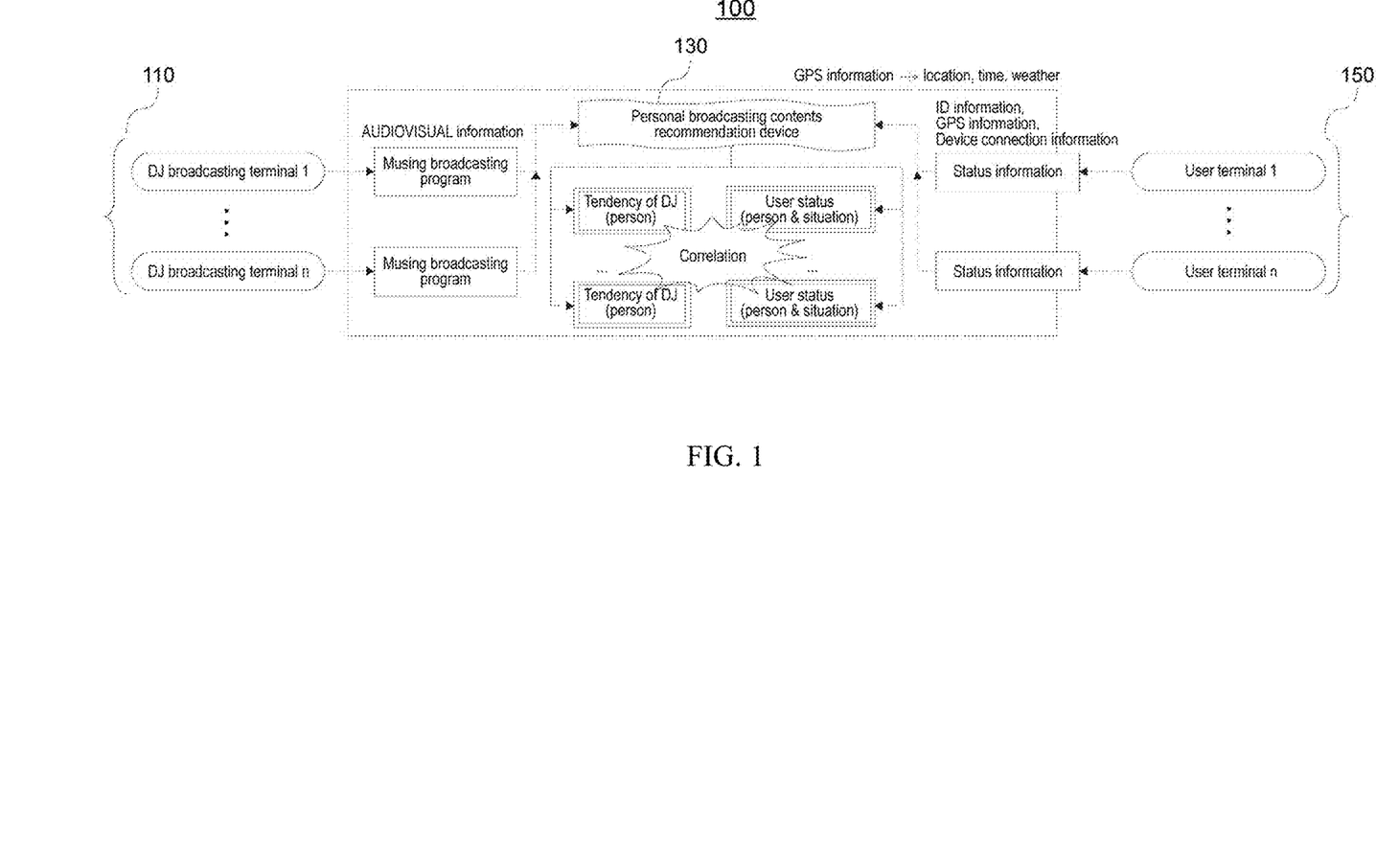
FIG. 1 illustrates a personal broadcasting contents recommendation system according to one embodiment of the present invention.

FIG. 1 illustrates a personal broadcasting contents recommendation system according to one embodiment of the present invention.

Referring to FIG. 1, the personal broadcasting recommendation system 100 includes a DJ broadcasting terminal 110, personal broadcasting contents recommendation device 130, and user terminal 150.

The DJ broadcasting terminal 110 corresponds to a computing device by which a personal broadcasting host may perform personal broadcasting and may be implemented by a smartphone, notebook, or computer; the present invention is not necessarily limited to the aforementioned device types and may be implemented by various other devices including a tablet PC. The DJ broadcasting terminal 110 may be connected to the personal broadcasting contents recommendation device 130 through a network, and the DJ broadcasting terminal 110 including the DJ broadcasting terminal 1 to n may be connected to the personal broadcasting contents recommendation device 130 simultaneously.

For example, a personal broadcasting host may provide a music or talk broadcasting program through the DJ broadcasting terminal 110. Talk broadcasting program may correspond to the broadcasting where a personal broadcasting host sets a specific subject and exchanges opinions with a personal broadcasting audience with respect to the corresponding subject.

The personal broadcasting contents recommendation device 130 may be implemented by a server corresponding to a computer or a program providing personal broadcasting contents to the user terminal 110 through a network. The personal broadcasting contents recommendation device 130 may be connected to the DJ broadcasting terminal 100 and the user terminal 150 wirelessly through Bluetooth or WiFi and may exchange data with the DJ broadcasting terminal 110 and the user terminal 150 through the network.

The personal broadcasting contents recommendation device 130 may be implemented by including a database (not shown) therein or separately from a database. When the personal broadcasting contents recommendation device 130 is implemented separately from a database, the personal broadcasting contents recommendation device 130 may be connected to the database to transmit and receive data.

A database may store various types of information used by the personal broadcasting contents recommendation device 130 to recommend personal broadcasting contents. For example, the database may store GPS information collected from the user terminal 150, user status information in association with the GPS information, personal broadcasting user information, and user preference information including use details of personal broadcasting users. The database may store various types of information related to the personal broadcasting such as the profile, broadcasting career, and broadcasting contents of a personal broadcasting host collected from the DJ broadcasting terminal 110.

A database may be composed of at least one independent database storing information belonging to a specific range or an integrated database merging at least one independent database.

The user terminal 150 corresponds to a computing device by which the user may use personal broadcasting contents and may be implemented by a smartphone, notebook, or computer; the present invention is not necessarily limited to the aforementioned device types and may be implemented by various other devices including a tablet PC. The user terminal 150 may be connected to the personal broadcasting contents recommendation device 130 through a network, and the user terminal 150 including the user terminal 1 to n may be connected to the personal broadcasting contents recommendation device 130 simultaneously.

Figure 2:
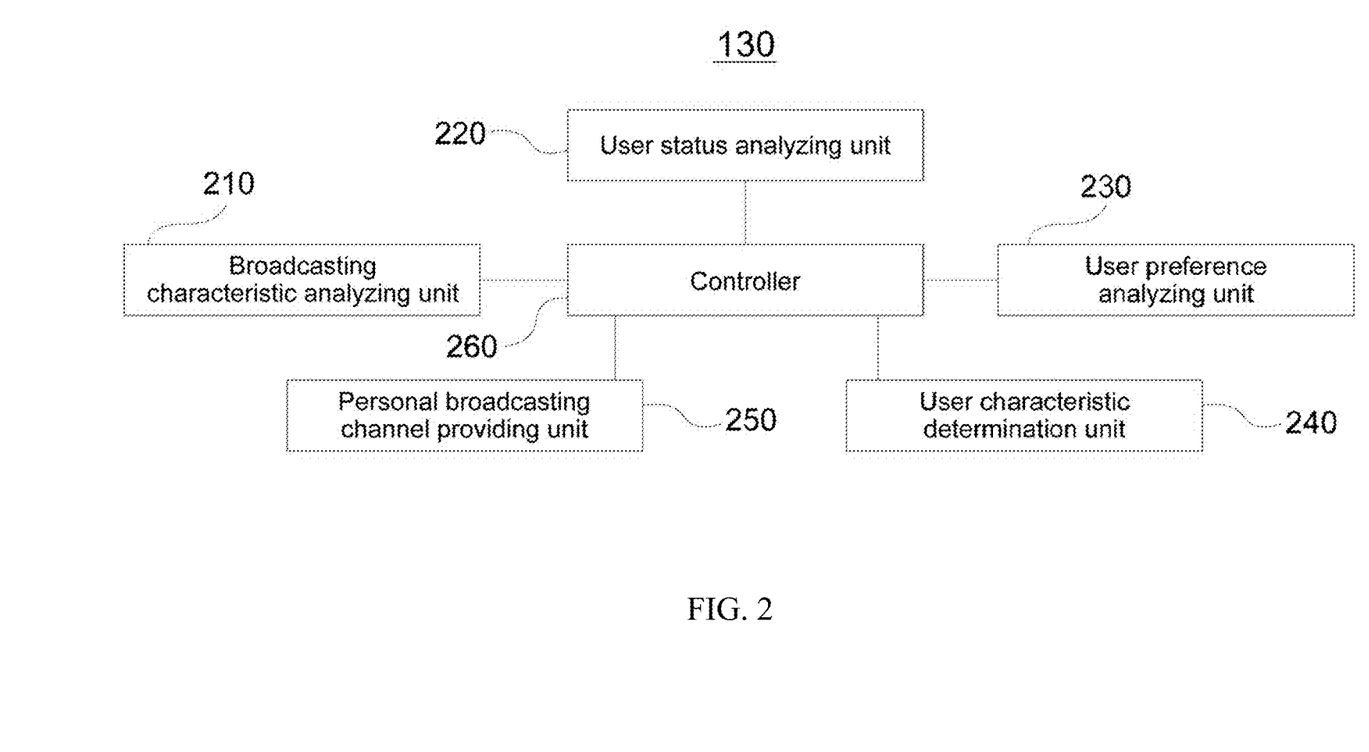
FIG. 2 illustrates a personal broadcasting contents recommendation device of FIG. 1.

FIG. 2 illustrates a personal broadcasting contents recommendation device of FIG. 1.

Referring to FIG. 2, a personal broadcasting contents recommendation device 130 according to one embodiment of the present invention includes a broadcasting characteristic analyzing unit 210, user status analyzing unit 220, user preference analyzing unit 230, user characteristics determination unit 240, personal broadcasting channel providing unit 250, and controller 260.

The broadcasting characteristic analyzing unit 210 may analyze broadcasting characteristics of a personal broadcasting host by analyzing personal broadcasting contents conducted by the personal broadcasting host. Here, broadcasting characteristics may correspond to the unique characteristics inherent to personal broadcasting according to the contents of personal broadcasting and a personal broadcasting host. The broadcasting characteristic analyzing unit 210 may determine broadcasting characteristics by reflecting the tendency of a personal broadcasting host.

Tendency of a personal broadcasting host may be determined by considering at least one of the voice, frequency of conversation, contents of conversation, and music preference and selection; the present invention is not necessarily limited to the scheme above, but tendency may be determined by reflecting various types of information required to determine tendency of a personal broadcasting host selectively. The broadcasting characteristic analyzing unit 210 may store the analysis result of broadcasting characteristics of a personal broadcasting host in a database in association with the personal broadcasting host.

In one embodiment, the broadcasting characteristic analyzing unit 210 may analyze the broadcasting characteristics of a personal broadcasting host and determine the broadcasting characteristic most similar to at least one, predefined broadcasting characteristic as the broadcasting characteristic of the corresponding personal broadcasting host. Predefined at least one broadcasting characteristic may be stored in a database.

In one embodiment, the broadcasting characteristic analyzing unit 210 may separate a first contents element created by the personal broadcasting host in the personal broadcasting contents and a second contents element not created by the personal broadcasting host from personal broadcasting contents. Here, the first contents element may correspond to the contents generated by the personal broadcasting host while hosting personal broadcasting, such as an announcement, voice, and motion.

The second contents element may correspond to various external contents used by the personal broadcasting host during personal broadcasting. For example, the second contents element may include voice contents including music, image contents including photos, and video contents including movie and advertisement.

In one embodiment, the broadcasting characteristic analyzing unit 210 may extract voice contents from the personal broadcasting contents, analyze frequency components of the corresponding voice contents, and thereby separate the first contents element and the second contents element. More specifically, the broadcasting characteristic analyzing unit 210 may search for unique frequency information about the voice of a personal broadcasting host stored in a database and separate the first contents element from the voice contents on the basis of the corresponding unique frequency information. The broadcasting characteristic analyzing unit 210 may separate the remaining portion of the voice contents excluding the first contents element as the second contents element.

In one embodiment, the broadcasting characteristic analyzing unit 210 may extract voice contents and analyze intensity or voice tone of the corresponding voice contents in addition to frequency components thereof, thereby separating the first contents element and the second contents element.

In one embodiment, the broadcasting characteristic analyzing unit 210 may determine broadcasting characteristic of a personal broadcasting host by applying different contents analysis techniques to the first and the second contents elements. The broadcasting characteristic analyzing unit 210 may separate the first and the second contents elements into voice contents, image contents, and video contents; and may apply different contents analysis techniques according to the types of the respective contents.

Here, the contents analysis technique may correspond to a general analysis algorithm developed for analyzing voice, image, and video; and may include a process of analyzing the corresponding contents, extracting a characteristic element, and classifying the contents into a predefined group according to the extracted characteristic element.

In one embodiment, the broadcasting characteristic analyzing unit 210 may determine a core keyword through keyword analysis with respect to the first contents element and determine specific associated words by analyzing correlation between each of a plurality of associated words dependent on the core keyword and the second contents element.

When the first contents element is voice contents, the broadcasting characteristic analyzing unit 210 may extract keywords from the voice contents and determine a core keyword by analyzing the corresponding keywords. When the first contents element is image contents, the broadcasting characteristic analyzing unit 210 may extract keywords related to the image through image analysis of the contents and determine a core keyword by analyzing the corresponding keywords. When the first contents element is video contents, the broadcasting characteristic analyzing unit 210 may analyze metadata of the video, extract keywords related thereto, and determine a core keyword by analyzing the corresponding keywords.

After determining a core keyword, the broadcasting characteristic analyzing unit 210 may extract a plurality of associated words dependent on the corresponding core keyword and determine specific associated words by analyzing correlation between each of a plurality of associated words and the second contents element.

More specifically, among the keywords extracted from the first contents element, the broadcasting characteristic analyzing unit 210 may extract keywords related to the core keyword as a plurality of associated words and extract sub-keywords derived from the core keyword as a plurality of associated words. The broadcasting characteristic analyzing unit 210 may extract keywords related to the second contents element by analyzing the second contents element and determine specific associated words from among a plurality of associated words on the basis of similarity between each of the plurality of associated words and the keywords related to the second contents element.

The user status analyzing unit 220 may analyze user status on the basis of movement displacement of the user terminal 150. Here, the movement displacement may include movement direction and movement speed. The movement direction may be calculated on the basis of positions at two different time points forming a specific time interval, and the movement speed may be calculated by measuring the amount of change in the movement distance per hour. In one embodiment, the user status analyzing unit 220 may calculate movement displacement by analyzing locations of the user terminal 150 collected at specific time points and analyze the user status by analyzing correlation between the movement pattern analyzed on the basis of the movement displacement and a regular life pattern. Here, the regular life pattern may correspond to a specific movement pattern observed periodically at specific times.

More specifically, the user status analyzing unit 220 may analyze the movement pattern of the corresponding user on the basis of movement displacement of the user terminal 150. The movement pattern of the user may include standing still, walking, running, and moving by vehicle. A standstill may include the activity that performs static tasks such as resting in a specific place, sleeping, and meeting. Moving by vehicle may include movement by various transportation means such as a car, bus, subway, train, and airplane. The user status analyzing unit 220 may analyze the movement pattern of the user and compare the analyzed pattern with the regular life pattern stored in a database, thereby analyzing the user's status.

The personal broadcasting contents recommendation device 130 may collect position information periodically from the user terminal 150, analyze movement pattern of the user on the basis of the collected position information, and store the analyzed movement pattern into the database. The personal broadcasting contents recommendation device 130 may analyze the regular life pattern of the user by analyzing movement pattern information of the user collected for a specific time period and store the analyzed regular life pattern to a database.

The user status analyzing unit 220 may calculate similarity by comparing a movement pattern analyzed on the basis of movement displacement with a regular life pattern and determine the regular life pattern associated with the highest similarity among the calculated similarities. The user status analyzing unit 220 may determine the current status of the user on the basis of the regular life pattern.

For example, suppose the regular life pattern of a user includes jogging in a park or attending a class of a private academy at 3:00 PM on weekdays. If a movement pattern collected from the user terminal 150 around 3 PM indicates running, the user status analyzing unit 220 may determine that the user is jogging in a park since the current movement pattern exhibits the highest similarity to the pattern of jogging in a park among the regular life pattern.

The user preference analyzing unit 230 may analyze user preference on the basis of user preference contents. The user preference analyzing unit 230 may analyze the user preference, store the analyzed user preference to a database, and update user preference information stored in the database.

In one embodiment, the user preference analyzing unit 230 may determine user preference by determining at least one of the first and the second contents element included in the user preference contents. The user preference contents may correspond to personal broadcasting contents that the user frequently uses. For example, when a personal broadcasting user frequently listens to a music broadcasting program, the corresponding user's preference may correspond to the preference related to the music frequently played in the music broadcasting program, which is one of the second contents elements. Also, the preference of the corresponding user may correspond to the preference related to a specific personal broadcasting host, which is one of the first contents elements.

The user characteristic determination unit 240 may determine the current user characteristics including the user status analyzed through the user status analyzing unit 220 and the user preference analyzed through the user preference analyzing unit 230. More specifically, the current user characteristics may be determined by associating user preference in a specific situation of the current user.

For example, suppose the user status analyzing unit 220 analyzes the current user status as 'jogging in a park', and the user preference analyzing unit 230 analyzes the user preference as 'favoring an exciting music broadcasting program'. In this case, the user characteristic determination unit 240 may determine the current user characteristics as 'favoring an exciting music broadcasting program while jogging in a park'.

In one embodiment, the user characteristic determination unit 240 may determine the life pattern inferred at the current time point and a life pattern-dependent user preference related to the personal broadcasting contents most preferred in the life pattern as the current user characteristics.

The user characteristic determination unit 240 may determine the life pattern among the life patterns stored in the database most similar to the user status analyzed by the user status analyzing unit 220 as the life pattern of the current user. The user characteristic determination unit 240 may extract the most preferred personal broadcasting contents from the life pattern of the current user stored in the database and determine the extracted personal broadcasting contents as the preference of the current user. The user characteristic determination unit 240 may determine the current user characteristics by associating the life pattern of the current user with the preference of the current user.

The personal broadcasting channel providing unit 250 may provide at least one personal broadcasting channel by searching for broadcasting characteristics of a personal broadcasting host that matches the current user characteristics determined by the user characteristic determination unit 240. The personal broadcasting channel providing unit 250 may provide a recommended personal broadcasting channel by searching for a personal broadcasting program that matches the current user characteristics or broadcasting characteristics of a personal broadcasting host stored in the database.

In one embodiment, the personal broadcasting channel providing unit 250 may provide a recommended personal broadcasting channel by searching for a personal broadcasting program with a similarity larger than a specific value between the current user characteristics and the broadcasting characteristics of a personal broadcasting host stored in the database. Here, the similarity refers to the degree of similarity between the user characteristics and the broadcasting characteristics of a personal broadcasting host and may be calculated on the basis of the items matched with each other among those items constituting the user characteristics and those items constituting the broadcasting characteristics of a personal broadcasting host.

In one embodiment, the personal broadcasting channel providing unit 250 may determine at least one recommended personal broadcasting channel on the basis of a life pattern-dependent user preference in the current user characteristics. For example, if the current user characteristic is 'favoring an exciting music broadcasting program while jogging in a park', the personal broadcasting channel providing unit 250 may search for a personal broadcasting program associated with an exciting music program from a database on the basis of the 'preference to exciting music broadcasting programs' of the current user characteristics and determine the search result as a recommended personal broadcasting channel.

The controller 260 may control the overall operation of the personal broadcasting contents recommendation device 130 and manage a control flow or a data flow through the broadcasting characteristic analyzing unit 210, user status analyzing unit 220, user preference analyzing unit 230, user characteristic determination unit 240, and personal broadcasting channel providing unit 250.

Figure 3:
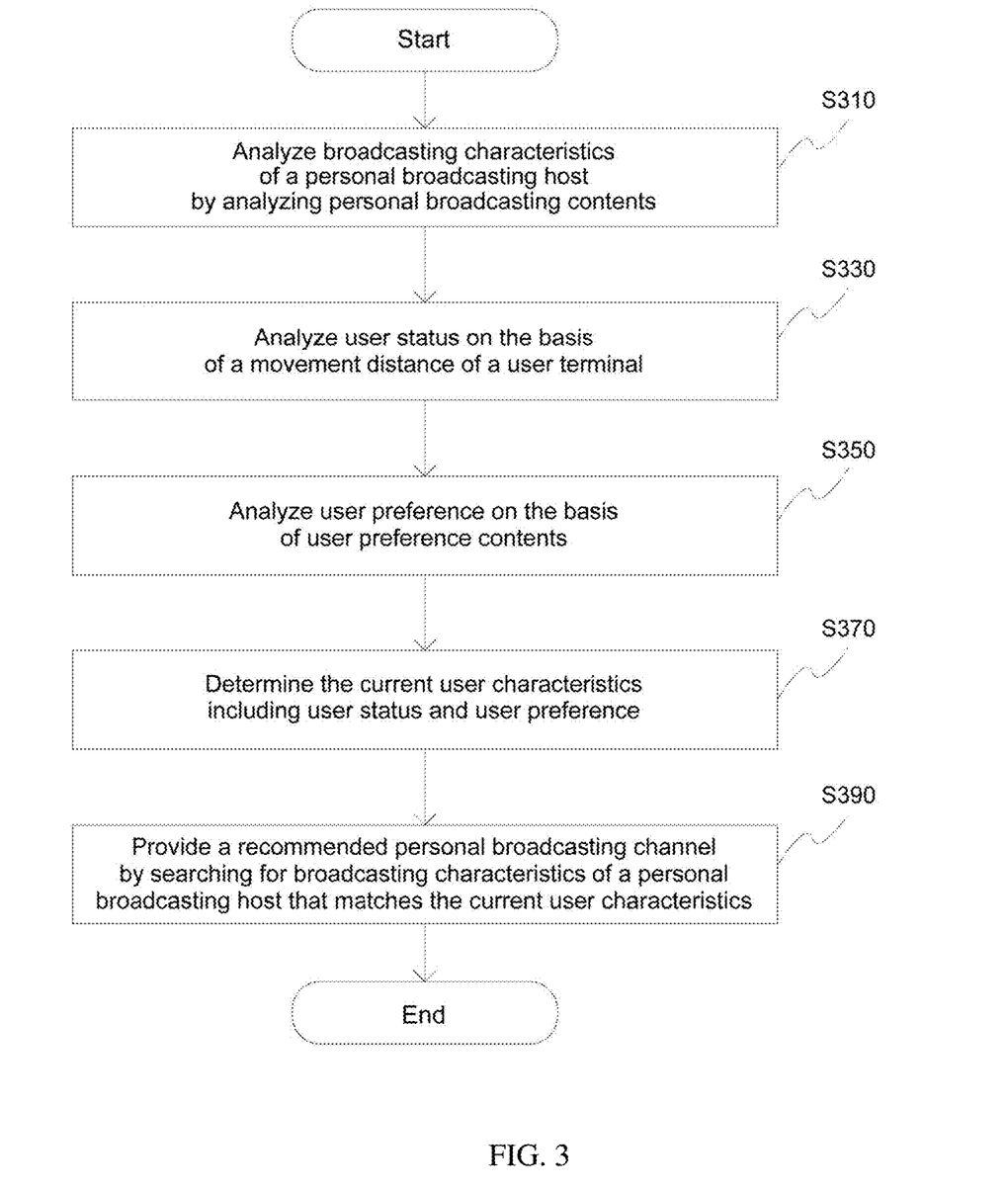
FIG. 3 is a flow diagram illustrating a process of recommending personal broadcasting contents performed in a personal broadcasting contents recommendation device according to one embodiment of the present invention.

FIG. 3 is a flow diagram illustrating a process of recommending personal broadcasting contents performed in a personal broadcasting contents recommendation device according to one embodiment of the present invention.

Referring to FIG. 3, the personal broadcasting contents recommendation device 130 may analyze broadcasting characteristics of a personal broadcasting host by analyzing personal broadcasting contents through the broadcasting characteristic analyzing unit 210, S310. In one embodiment, the broadcasting characteristic analyzing unit 210 may separate a first contents element created by the personal broadcasting host and a second contents element not created by the personal broadcasting host from the personal broadcasting contents.

In one embodiment, the broadcasting characteristic analyzing unit 210 may determine a core keyword through keyword analysis about the first contents element and determine a specific associated word by analyzing correlation between each of a plurality of associated words dependent on the core keyword and the second contents element.

In one embodiment, after determining the core keyword, the broadcasting characteristic analyzing unit 210 may extract a plurality of associated words dependent on the corresponding core keyword. The broadcasting characteristic analyzing unit 210 may determine a specific associated word from a plurality of associated words on the basis of the similarity between each of the plurality of associated words and the keyword related to the second contents element.

For example, when a personal broadcasting host talks about the weather while playing music, the broadcast characteristic analyzing unit 210 may determine the 'weather' as a core keyword. The broadcasting characteristic analyzing unit 210 may determine 'cloudy', 'fine', 'shower', and 'storm' as a plurality of associated words related to the core keyword, 'weather'. The broadcasting characteristic analyzing unit 210 may analyze the music played by the personal broadcasting host and determine 'dance' , 'ballad' , and 'classic' as keywords associated with the mood of the entire music played.

When the mood of the entire music played by the personal broadcasting host is 'ballad', the broadcasting characteristic analyzing unit 210 may determine 'cloudy', which exhibits the highest correlation with the 'ballad' among a plurality of associated words, as a specific associated word. The broadcasting characteristic analyzing unit 210 may analyze 'ballad based on the cloudy weather' as a broadcasting characteristic of the personal broadcasting host and store the analyzed result in the database as a broadcasting characteristic associated with the personal broadcasting host.

When the personal broadcasting host talks about exercise while playing exciting dance music, the broadcasting characteristic analyzing unit 210 may analyze 'dance based on exercise' as the broadcasting characteristic of the personal broadcasting host.

In one embodiment, the broadcasting characteristic analyzing unit 210 may analyze and update the broadcasting characteristics of a personal broadcasting host by analyzing personal broadcasting contents conducted by the personal broadcasting host in real time. More specifically, the broadcasting characteristic analyzing unit 210 may update the broadcasting characteristics of a personal broadcasting host stored in the database by analyzing at least one of the announcement and contents provided by the corresponding personal broadcasting host in real time.

In one embodiment, the broadcasting characteristic analyzing unit 210 may determine broadcasting characteristics by reflecting the tendency of a personal broadcasting host. The broadcasting characteristic analyzing unit 210 may update the tendency of the personal broadcasting host in real time by analyzing at least one of the announcement and contents provided by the personal broadcasting host in real time. The broadcasting characteristic analyzing unit 210 may determine the corresponding broadcasting characteristics by reflecting the tendency of the updated personal broadcasting host and update the corresponding broadcasting characteristics stored in the database.

The personal broadcasting contents recommendation device 130 may analyze the user status on the basis of movement displacement of the user terminal through the user status analyzing unit 220, S330.

The personal broadcasting contents recommendation device 130 may analyze the user preference on the basis of the user preferred contents through the user preference analyzing unit 230, S350. In one embodiment, the user preference analyzing unit 230 may analyze the user preference on the basis of at least one of the use details, use times, and use places of a personal broadcasting user; and user status for a specific period.

For example, the user preference analyzing unit 230 may determine the user preference by associating the personal broadcasting programs frequently enjoyed by the user at specific times and determine the user preference by associating the personal broadcasting programs frequently enjoyed by the user at specific places. The user preference analyzing unit 230 may determine the user preference by associating the personal broadcasting programs frequently enjoyed by the user in a specific user situation.

The personal broadcasting contents recommendation device 130 may determine the current user characteristics consisting of the user status and the user preference through the user characteristic determination unit 240, S370.

The personal broadcasting contents recommendation device 130 may provide a recommended personal broadcasting channel by searching for broadcasting characteristics of a personal broadcasting host that match the current user characteristics through the personal broadcasting channel providing unit 250, S390. In one embodiment, the personal broadcasting channel providing unit 250 may provide at least one recommended personal broadcasting channel information by using a notification message of the user terminal 150.

Figure 4A:
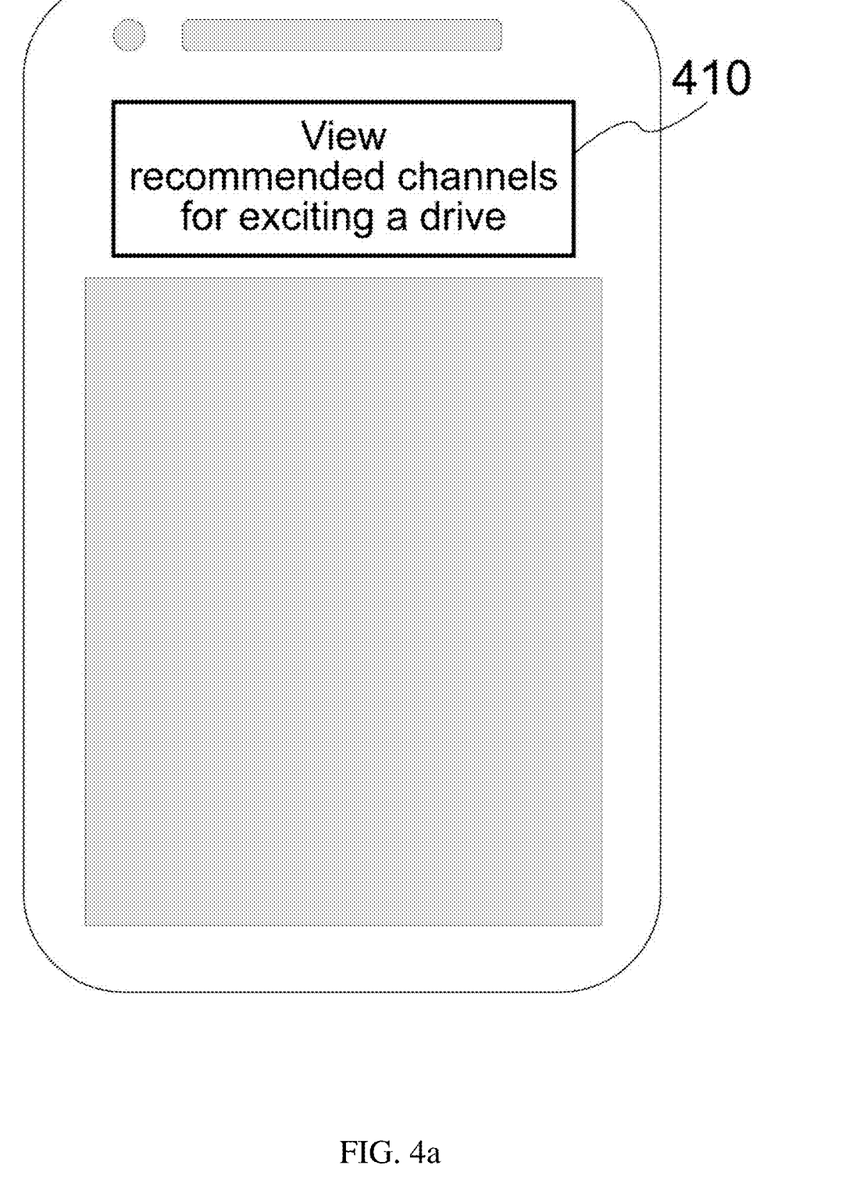
FIG. 4a illustrates a personal broadcasting contents recommendation notification message provided by a personal broadcasting contents recommendation device according to one embodiment of the present invention.

FIG. 4a illustrates a personal broadcasting contents recommendation notification message provided by a personal broadcasting contents recommendation device according to one embodiment of the present invention.

Referring to FIG. 4a, the personal broadcasting contents recommendation device 130 may provide recommended personal broadcasting channel information to the user terminal 150 by using a notification message 410. The notification message 410 may include information about current status of the user and personal broadcasting channel information related thereto. When a personal broadcasting user attempts to connect to a recommended personal broadcasting channel, the user may be connected automatically to the corresponding personal broadcasting program by selecting the notification message 410.

When receiving a response to the notification message from the user terminal 150, the personal broadcasting contents recommendation device 130 may provide the corresponding notification message and associated personal broadcasting contents to the user terminal 150.

In one embodiment, the personal broadcasting channel providing unit 250 may provide a recommended personal broadcasting channel by searching for a personal broadcasting program exhibiting a similarity higher than a specific value between the current user characteristics and the broadcasting characteristics of the personal broadcasting host stored in the database.

In one embodiment, the personal broadcasting channel providing unit 250 may provide a recommended personal broadcasting channel by searching for a personal broadcasting program exhibiting a similarity higher than a specific value on the basis of the similarity calculated by the following mathematical equation between the current user characteristics and the broadcasting characteristics of the personal broadcasting host stored in the database.

$$S = \log_{10} \sum_{i}^{N} w_i \times P_i \quad \text{[Equation]}$$

Here, S represents the similarity, N represents the number of matching items, Wi represents the weight for each item, and Pi represents the score for each item.

The similarity may increase in proportion to the number of matching items included in the current user characteristics and the broadcasting characteristics of a personal broadcasting host. The similarity may increase in proportion to the score and weight assigned to a matched item. The similarity may have a value ranging from 1 to 10 and may become higher as the similarity value approaches 10. When there is no item matching the user characteristics and the broadcasting characteristics of a personal broadcasting host, the similarity may be set to 1 by default. The weight may be determined according to the importance of an item belonging to the user characteristics and the broadcasting characteristics of a personal broadcasting host, and the score for each item may be determined by taking into account the weight for each item so that the similarity value when the entire items match to each other becomes 10.

In one embodiment, the personal broadcasting channel providing unit 250 may provide at least one recommended personal broadcasting channel and at least one popular personal broadcasting channel together. The personal broadcasting user may use a recommended personal broadcasting channel or connect to a personal broadcasting program that the user wants by using the currently most popular personal broadcasting channel.

Figure 4B:
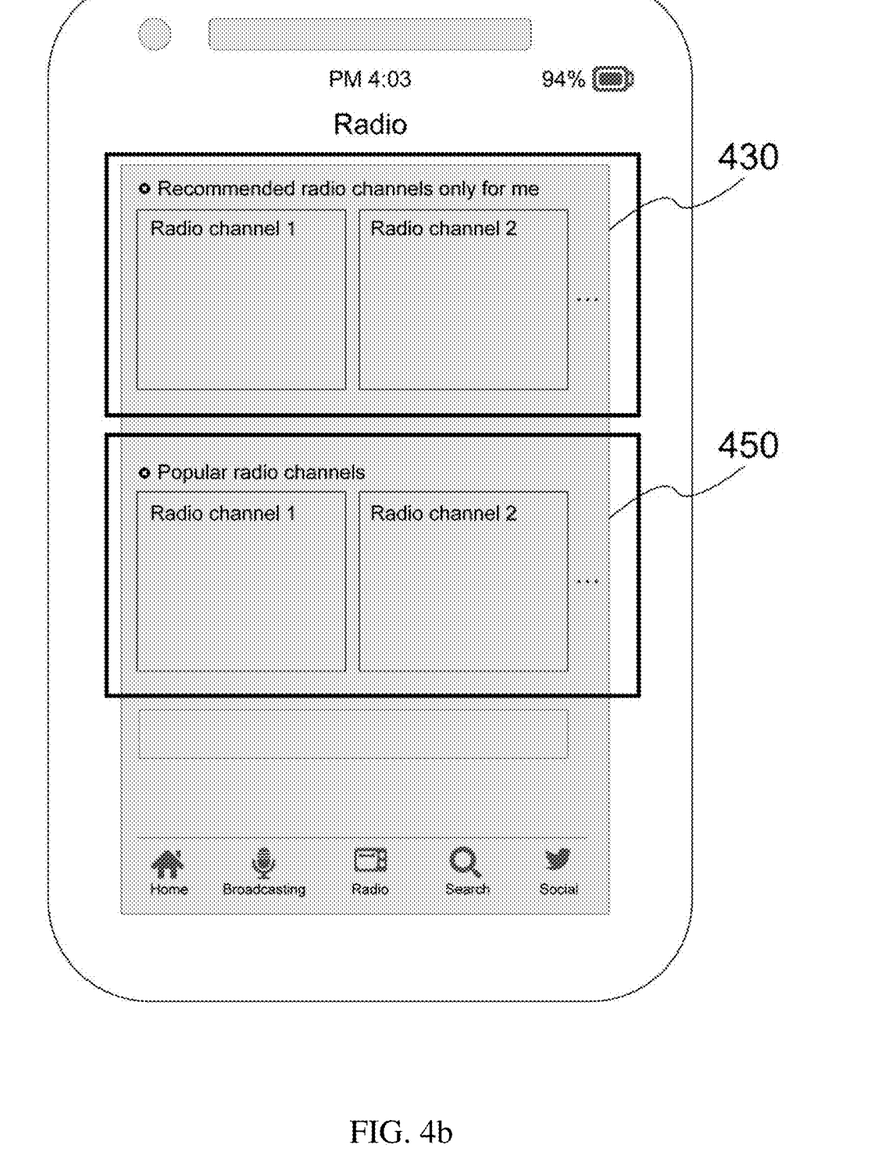
FIG. 4b illustrates a personal broadcasting contents recommendation list provided by a personal broadcasting contents recommendation device according to one embodiment of the present invention.

FIG. 4b illustrates a personal broadcasting contents recommendation list provided by a personal broadcasting contents recommendation device according to one embodiment of the present invention.

Referring to FIG. 4b, the personal broadcasting contents recommendation device 130 may provide the user terminal 150 with recommended personal broadcasting channel information 430 and popular personal broadcasting channel information 450 together. The recommended personal broadcasting channel information 430 and the popular personal broadcasting channel information 450 may include a representative image of a personal broadcasting channel and the subject of the personal broadcasting program. The personal broadcasting contents recommendation device 130 may provide the user terminal 150 with the recommended personal broadcasting channel information 430 and the popular personal broadcasting channel information 450 in the form of a list. The present invention is not necessarily limited to the aforementioned form, however, and may provide the information in various other forms.

Although the present invention has been described with reference to preferred embodiments given above, it should be understood by those skilled in the art that various modifications and variations of the present invention may be made without departing from the technical principles and scope specified by the appended claims below.

The disclosed technology provides the following advantageous effects. However, since it is not intended that a specific embodiment provides all of the following effects or only the following effects, the technical scope of the disclosed technology should not be construed as being limited by the specific embodiment.

A method for recommending personal broadcasting contents according to one embodiment of the present invention may analyze a personal broadcasting host by analyzing personal broadcasting contents conducted by the personal broadcasting host.

A method for recommending personal broadcasting contents according to one embodiment of the present invention may provide a recommended personal broadcasting channel by matching broadcasting characteristics of a personal broadcasting host and the characteristics of the user.

What is claimed is:

1. A method performed by a personal broadcasting contents recommendation device for recommending personal broadcasting contents to a user terminal, comprising:

(a) analyzing personal broadcasting contents broadcasted by personal broadcasting terminals, and acquiring broadcasting characteristics of hosts of the personal broadcasting terminals based on the analyzed personal broadcasting contents;

(b) determining a current user characteristic of a user of the user terminal, the current user characteristic comprises at least one of a user status and a user preference; and (c) searching for a host having a broadcasting characteristic that matches with the current user characteristic, and providing, to the user terminal, at least one recommended personal broadcasting channel based on a result of the searching, wherein the (b) step comprises:
detecting movement displacements of the user terminal;
acquiring a movement pattern of the user based on the detected movement displacements; and
determining the current user characteristic including the acquired movement pattern of the user, and wherein the (c) step comprises providing the at least one recommended personal broadcasting channel based on the current user characteristic including the movement pattern of the user.

2. The method of claim 1, wherein the (b) step further comprises:
calculating the movement displacement by analyzing positions of the user terminal collected at specific time points; and
determining the current user characteristic by analyzing correlation between a movement pattern analyzed on the basis of the movement displacement and a regular life pattern.

3. The method of claim 1, wherein the (b) step comprises determining a life pattern inferred at a current time and a life pattern dependent user preference about personal broadcasting contents most preferred out of the life pattern as the current user characteristic.

4. The method of claim 3, wherein the (c) step comprises determining the at least one recommended personal broadcasting channel on the basis of the life pattern dependent user preference contained in the current user characteristics.

5. The method of claim 1, wherein the step (c) step comprises
providing the at least one recommended personal broadcasting channel by searching for a personal broadcasting channel having a higher similarity with the current user characteristic than a specific value on the basis of the similarity between the current user characteristic and the broadcasting characteristic of the host, calculated by the following mathematical Equation 1:

$$S = \log_{10} \sum_{i}^{N} w_i \times P_i,$$ Equation 1 where
S represents the similarity,
N represents a number of matching items,
Wi represents a weight for each matching item, and
Pi represents a score for each matching item.

6. A method performed by a personal broadcasting contents recommendation device for recommending personal broadcasting contents to a user terminal, comprising:

(a) analyzing personal broadcasting contents broadcasted by personal broadcasting terminals, and acquiring broadcasting characteristics of hosts of the personal broadcasting terminals based on the analyzed personal broadcasting contents;

(b) determining a current user characteristic of a user of the user terminal, the current user characteristic comprises at least one of a user status and a user preference; and (c) searching for a host having a broadcasting characteristic that matches with the current user characteristic, and providing, to the user terminal, at least one recommended personal broadcasting channel based on a result of the searching, wherein the (a) step comprises:
identifying, from the personal broadcasting contents broadcasted by the personal broadcasting terminals, first elements which are created by the personal broadcasting terminals and second elements which are not created by the personal broadcasting terminals; and
determining the broadcasting characteristics of the hosts of the personal broadcasting terminals by applying a first contents analysis technique to the first elements and applying a second contents analysis technique to the second elements.

7. The method of claim 6, wherein the (a) step further comprises:
determining a core keyword through a keyword analysis related to the first element; and
determining a specific associated word by analyzing correlation between each of a plurality of associated words dependent on the core keyword and the second element.

8. The method of claim 6, wherein the (b) step further comprises
determining the current user characteristic by determining one of the first element and the second element contained in a preference content of the user.

* * * * *